United States Patent [19]

Heim et al.

[11] Patent Number: 5,749,176
[45] Date of Patent: May 12, 1998

[54] MOTOR VEHICLE DOOR

[75] Inventors: Gunther Heim, Mainhausen; Thomas Überreiter, Mühlheim; Jürgen Hock, Aschaffenburg; Holger Bischoff, Obertshausen, all of Germany

[73] Assignee: Ymos Aktiengesellschaft Industrieprodukte, Obertshausen, Germany

[21] Appl. No.: 695,749

[22] Filed: Aug. 8, 1996

[30] Foreign Application Priority Data

Aug. 8, 1995 [DE] Germany .......... 195 29 088.7

[51] Int. Cl.$^6$ ................................ B60J 5/04
[52] U.S. Cl. ............................................. 49/502
[58] Field of Search ............... 49/502; 296/146.5, 296/146.7

[56] References Cited

U.S. PATENT DOCUMENTS

| | | | |
|---|---|---|---|
| 4,815,984 | 3/1989 | Sugiyama et al. | 49/502 X |
| 4,907,836 | 3/1990 | Ueda et al. | 49/502 X |
| 5,355,629 | 10/1994 | Kimura et al. | 49/502 |
| 5,469,668 | 11/1995 | Heim et al. | 49/502 |
| 5,584,144 | 12/1996 | Hisano | 49/351 X |

FOREIGN PATENT DOCUMENTS

| | | |
|---|---|---|
| 0613797 A2 | 11/1993 | European Pat. Off. . |
| 3309149 | 3/1983 | Germany . |
| 4026217 | 8/1990 | Germany . |
| 4226117 | 8/1992 | Germany . |
| 4244346 | 12/1992 | Germany . |

*Primary Examiner*—Jerry Redman
*Attorney, Agent, or Firm*—Spencer & Frank

[57] ABSTRACT

A motor vehicle door of the type having a door hollow (4) disposed between an inside wall and an outside wall (2, 3), electrical lines (11; 13; 15; 17), linkages (21) and/or Bowden cables (22) (altogether identified as supply lines below) being arranged in and with the door hollow. To accomplish that a forcible opening of the door from the outside by inserting tools, etc. into the door hollow is almost impossible, the supply lines (11; 13; 15; 17; 21; 22) are arranged on or in a support element (6; 20; 23) such that they are at least partially covered toward the outside wall (3) of the vehicle door (1; 100).

11 Claims, 3 Drawing Sheets

MOTOR VEHICLE DOOR

REFERENCE TO RELATED APPLICATIONS

This application claims the priority of German application Serial No. 195 29 088.7, filed Aug. 8, 1995, which is incorporated herein by reference.

BACKGROUND OF THE INVENTION

The invention relates to a motor vehicle door having a door hollow disposed between an inside wall, and an outside wall in which door hollow electrical lines, linkages and/or Bowden cables (referred to collectively as supply lines below) are arranged, the supply lines are arranged on or in a support element while being at least partially covered toward the outside wall of the vehicle door.

In known motor vehicle doors, a number of electrical lines as well as linkages and/or Bowden cables (altogether also identified as supply lines below) which, inter alia, serve to lock and unlock the door, are disposed in the door hollow, which is formed by the outside and inside wall. For example, the electrical feed line of the central locking system to the door lock as well as the linkage from the inside unlocking system to the lock are guided through this hollow.

The drawback of the known vehicle doors is that the supply lines are not specifically protected against manipulation from the outside.

Rather, the supply lines are installed in the door hollow so as to be unattached or free, or they are glued to the inside wall of the door. Thus, it is frequently possible for unauthorized persons to easily pull out the lines for the central locking system from the outside through the window seal of the corresponding motor vehicle door with the aid of specialized tools and, for example, to unlatch the locks by supplying current. The linkage or the Bowden cable of the inside locking system can be manipulated in a corresponding manner so that the respective door can be opened. Finally, known motor vehicle doors have the drawback that the supply lines are not specifically protected against moisture.

It is the object of the invention to provide a motor vehicle door of the type specified at the outset in which, compared to known doors, a forcible opening of the door from the outside by inserting tools etc. into the door hollow is made considerably more difficult.

SUMMARY OF THE INVENTION

The above object generally is achieved according to the invention by a motor vehicle door having: an inside wall and an outside wall defining a door hollow therebetween; supply lines including at least one of electrical lines, mechanical linkages and Bowden cables arranged in the door hollow; and a support element which is disposed in the door hollow; and wherein the supply lines are arranged at least adjacent the support element and are at least partially covered by the support element in a direction toward the outside wall of the vehicle door. Further particularly advantageous features of the invention are disclosed.

The invention is essentially based on the concept of securing a support element, preferably made of metal, in the vehicle hollow with the support element covering the supply lines toward the outside wall of the vehicle door.

In an advantageous further embodiment of the invention, the support element is provided as a hollow section which is open toward the inside wall of the vehicle door, so that the supply lines can be installed quickly when the door is assembled. The open side of the hollow section is then covered by the inside wall, once the inside wall is installed.

The supply lines can be protected from manipulation by third parties in a particularly simple manner if the motor vehicle door is a sectional frame door. In this case, the corresponding frame sections are already selected from the outset such that, in line with the cross section that is required in other respects, they are provided with one or two additional ribs which remain open toward the inside wall and which can be covered by the inside wall.

In order to ensure a precise guidance of the supply lines, the latter are guided in holding members which are arranged on the support element. This also prevents the respective linkages or Bowden cables from hitting any door components during the operation of the vehicle and from producing noise.

A further advantage of the doors according to the invention is that the arrangement of the supply lines on the support element creates a space which protects the lines against moisture from the outside.

BRIEF DESCRIPTION OF THE DRAWINGS

Further details and advantages of the invention result from the following embodiments which are explained by the Figures wherein.

DETAILED DESCRIPTION OF THE PREFERRED EMBODIMENT

Figure 1:
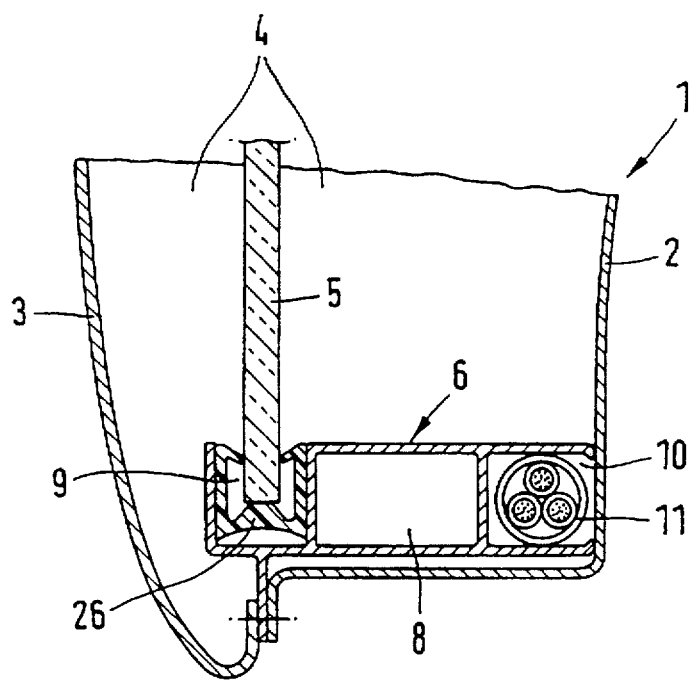
FIG. 1 is a partial sectional view through the floor-end region of a sectional frame door according to the invention of a motor vehicle.

FIG. 1 shows a sectional or profiled frame door 1 of a motor vehicle having a door hollow 4 delimited by an inside wall 2 and an outside wall 3. A window pane 5 which can be lowered is shown in its lowered position in the door hollow 4.

The sectional frame of the door 1 is provided with a hollow section or profiled member 6 made of aluminum near its lower or floor end. In a comparable known door, this section is comprised of a hollow chamber 8 and a rail portion 9 having a U-shaped cross section for guiding the pane 5 in its lowered position, with seals 26 being provided in the rail portion 9. According to the invention, the section or member 6 is additionally provided with a conduit or portion 10 which faces the inside wall 2 and which is open in a direction toward the inside wall 2 of the motor vehicle door 1. Thus, the supply lines identified by 11 in FIG. 1 can be easily and very quickly inserted into the conduit or portion 10 when the door 1 is assembled. By fastening the inside wall 2 to the sectional frame 12 (FIG. 2), the opening of the conduit 10 is covered so that, even with, for example, bent wires (when the window is in the closed position) it is not possible to grasp from the outside wall 3 around the hollow section 6, for example, to pull out the supply lines 11 or to separate them.

Figure 2:
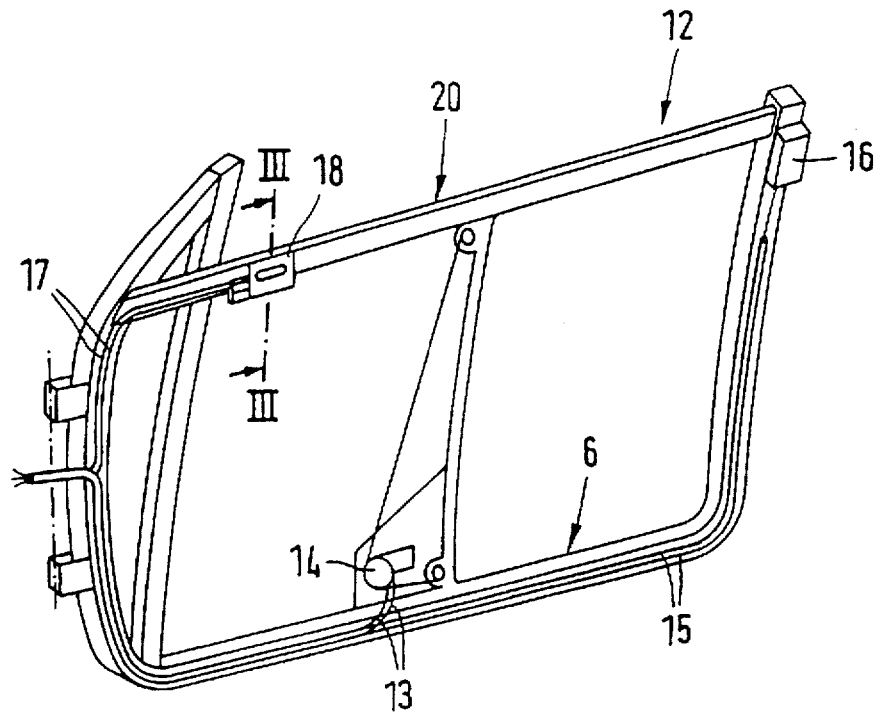
FIG. 2 is a perspective representation of the sectional frame of the motor vehicle door illustrated in FIG. 1.

As can be seen from FIG. 2, a cable 13 for a window lifter motor identified by reference numeral 14 extends approximately to the center of the lower hollow section 6 and then branches off to the motor 14. The electrical line identified by 15 for the central locking system extends further up to the lock 16.

The electrical lines 17 for a window lifter switch 18 are arranged in a corresponding conduit 19 (FIG. 3) of an upper frame section 20. The linkages 21 for the inside unlocking system are also disposed in this conduit 19.

Figure 4:
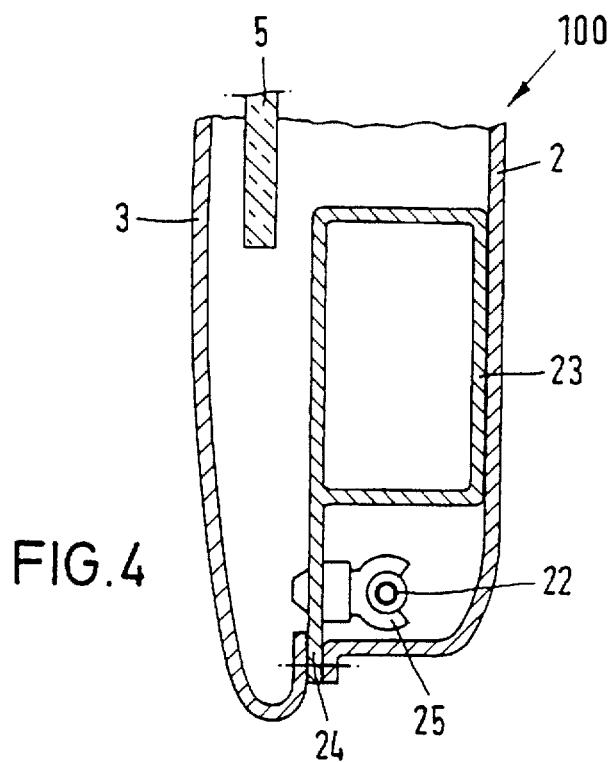
FIG. 4 is a partial sectional view through the floor-end region of a motor vehicle door according to the invention having holding members for a Bowden cable arranged in a sectional element of the door lower end.

FIG. 4 illustrates a further embodiment of a motor vehicle door 100 according to the invention in which the inside wall is again identified by reference numeral 2, the outside wall by 3 and the window pane by 5. For covering a Bowden cable 22, which is to be provided between an inside unlocking system and a door lock, the inside hollow frame section 23 arranged at the floor end of the frame is provided with a rib-shaped extension 24. The Bowden cable 22 is guided on this extension in clipped-on holding members 25. In this embodiment it is also not possible to manipulate the supply lines from the outside for purposes of unauthorized opening of the motor vehicle door 100 once the inside wall 2 is attached.

Figure 5:
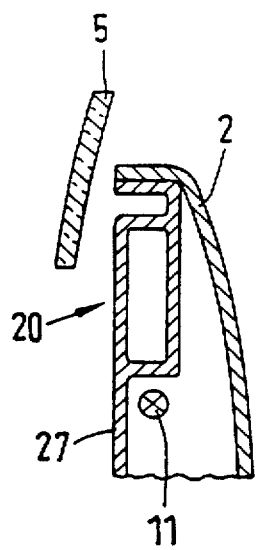
FIG. 5 to FIG. 7, show schematically represented partial cross sections through the respective upper door panel-end region of three further embodiments of motor vehicle doors according to the invention.
Figure 6:
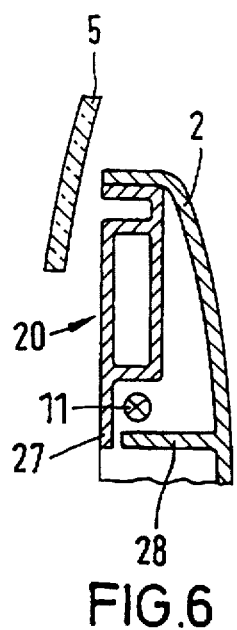
Figure 7:
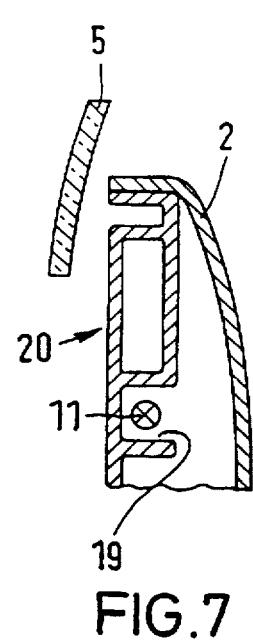

FIGS. 5–7 show three further embodiments of motor vehicle doors according to the invention in which only that door panel region is shown which faces the interior of the motor vehicle. Again, the window panes are identified by reference numeral 5, the inside walls by 2, the upper frame section by 20 and the supply lines by 11.

FIG. 5 shows an embodiment in which access from the outside to the supply line 11 is only prevented by a vertically extending rib-shaped extension 27 of the frame or support section 20. In the case shown in FIG. 6, the inside wall 2 is additionally provided with a plastic rib 28 which extends toward the extension 27 and covers the supply line 11 toward the bottom.

Figure 3:
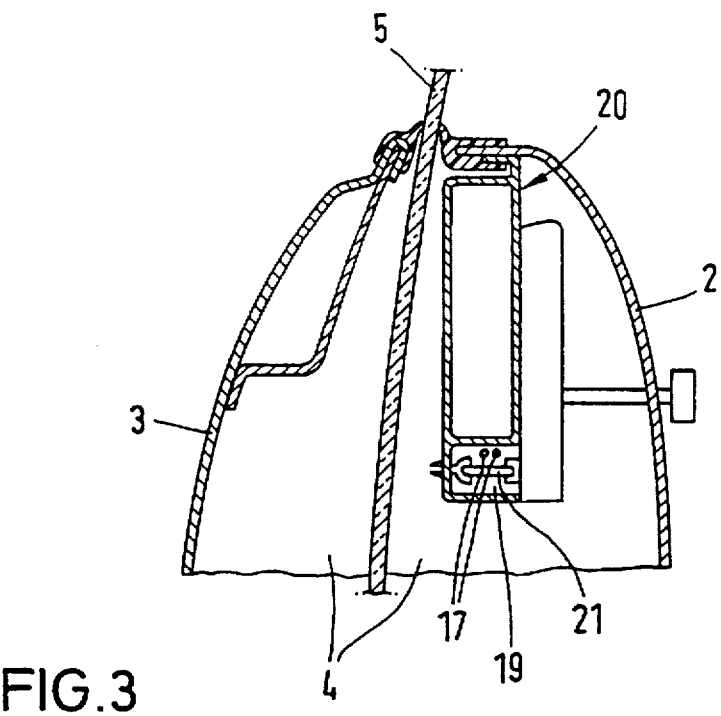
FIG. 3 is a cross section through the sectional frame shown in FIG. 2 along the cut line which is identified there as III—III, with the inside and outside wall being represented as well.

Finally, FIG. 7, essentially corresponds once again to the embodiment illustrated in FIG. 3 in which the lower end of the frame section 20 is configured as a conduit 19 which is open toward the inside wall 2.

The invention now being fully described, it will be apparent to one of ordinary skill in the art that any changes and modifications can be made thereto without departing from the spirit or scope of the invention as set forth herein.

What is claimed:

1. A motor vehicle door having an inside wall and an outside wall defining a door hollow therebetween, supply lines including at least one of electrical lines, mechanical linkages and Bowden cables arranged in the door hollow, and a door support element which is disposed in the door hollow; and wherein: the supply lines are arranged at least adjacent the support element; said support element has a rib-shaped extension which extends in a substantially vertical direction, which is disposed between said supply lines and said outer wall of said door, and which, together with the support element, covers the supply lines in a direction toward said outer wall of said vehicle door; and further comprising a rib disposed on an inner surface of said inside wall and extending toward said extension and adjacent said supplying lines.

2. A motor vehicle door according to claim 1, wherein said support element is a hollow section.

3. A motor vehicle door according to claim 2 wherein said hollow section is open in the direction toward said inside wall.

4. A motor vehicle door according to claim 1, wherein said support element is made of metal.

5. A motor vehicle door according to claim 4, wherein:

said motor vehicle door has a frame formed from profiled sectional members; and at least one of said sectional members is a hollow sectional member which is formed to receive said supply lines and serves as said support element.

6. A motor vehicle door according to claim 5, further comprising holding members mounted on said at least one support element for holding and guiding said supply lines.

7. A motor vehicle door according to claim 1, further comprising holding members mounted on said support element for holding and guiding said supply lines.

8. A motor vehicle door according to claim 1 wherein said door support element comprises a horizontally extending door frame member.

9. A motor vehicle door according to claim 8 wherein at least said inner wall of said door is fastened to said door frame member.

10. A motor vehicle door according to claim 9 wherein an upper end of said inner wall of said door is fastened to said door frame member along an upper end of said door frame member.

11. A motor vehicle door according to claim 10 further comprising a window seal mounted on said upper ends of said inner wall and said door frame member for engaging a window mounted in said door within said door hollow when said window is in an at least partially raised.

* * * * *